(12) United States Patent
Sasaki et al.

(10) Patent No.: US 9,156,515 B2
(45) Date of Patent: Oct. 13, 2015

(54) FUEL TANK FOR MOTORCYCLE, AND MOTORCYCLE INCLUDING SAME

(71) Applicant: HONDA MOTOR CO., LTD., Minato-Ku, Tokyo (JP)

(72) Inventors: Takashi Sasaki, Wako (JP); Yotaro Mori, Wako (JP); Katsuhiro Kunikiyo, Wako (JP); Yuki Mizukura, Wako (JP); Noriya Shimozato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/323,344

(22) Filed: Jul. 3, 2014

(65) Prior Publication Data

US 2015/0014078 A1 Jan. 15, 2015

(30) Foreign Application Priority Data

Jul. 10, 2013 (JP) ................................ 2013-144274

(51) Int. Cl.
*B62J 35/00* (2006.01)

(52) U.S. Cl.
CPC ....................................... *B62J 35/00* (2013.01)

(58) Field of Classification Search
CPC ......... B62J 35/00; B62K 11/00; B60K 11/00; B60K 15/063; B60K 13/02
See application file for complete search history.

(56) References Cited

U.S. PATENT DOCUMENTS

| 7,441,619 | B2* | 10/2008 | Hatakeyama | 180/68.3 |
| 8,181,729 | B2* | 5/2012 | Hiramatsu et al. | 180/68.3 |
| 2004/0050357 | A1* | 3/2004 | Idei et al. | 123/198 E |
| 2005/0051375 | A1* | 3/2005 | Momosaki | 180/219 |
| 2007/0272198 | A1* | 11/2007 | Domergue | 123/198 E |
| 2008/0314669 | A1* | 12/2008 | Buell | 180/219 |
| 2009/0008178 | A1* | 1/2009 | Buell | 180/225 |

FOREIGN PATENT DOCUMENTS

JP 4291044 B2 7/2009

* cited by examiner

*Primary Examiner* — Tony Winner
(74) *Attorney, Agent, or Firm* — Carrier Blackman & Associates, P.C.; Joseph P. Carrier; William D. Blackman

(57) ABSTRACT

An intake structure for a motorcycle provides an intake air flow passage in a fuel tank arranged at an upper portion of a vehicle body. Left and right upper tank members are provided at an upper portion of a vehicle body. The upper tank portions are each provided with a recessed portion that is opened upward and inward. A tank wall, having an L-shaped cross section, extends rearward and subsequently downward. An upper opening of the recessed portion is covered with a lid member, and thereby, the recessed portion effectively functions as an air-supply passage leading to an interior portion of an air cleaners.

16 Claims, 10 Drawing Sheets

FUEL TANK FOR MOTORCYCLE, AND MOTORCYCLE INCLUDING SAME

CROSS-REFERENCE TO RELATED APPLICATIONS

The present invention claims priority under 35 USC 119 based on Japanese patent application No. 2013-144274, filed on 10 Jul. 2013. The entire subject matter of this priority document, including specification, claims and drawings, is incorporated by reference herein.

BACKGROUND OF THE INVENTION

1. Technical Field of the Invention

The present invention relates to a fuel tank incorporating an intake structure for a motorcycle, and to a motorcycle incorporating such a fuel tank.

2. Background Art

A structure for a motorcycle is known, in which a hollow portion is formed in a main frame, the hollow portion configured as an intake passage extending rearwardly from a head pipe (for example, see JP Patent No. 4291044.

If a lightweight intake passage is arranged on a high place, such arrangement is advantageous in terms of lowering the center of gravity of a vehicle body.

In the conventional structure described above, such structure is advantageous for lowering the center of gravity, however, a shape of the main frame becomes complicated. Also, the degree of freedom in layout of the intake device is reduced.

SUMMARY OF THE INVENTION

The present invention has been accomplished in view of the above-mentioned circumstances and it is an object of the present invention to a motorcycle having an intake passage formed in a fuel tank arranged in an upper portion of a vehicle body, and easily molding the fuel tank. It is another object of the present invention to provide a fuel tank having an intake air flow passage formed therein.

Reference numbers are included in the following description corresponding to the reference numbers used in the drawings. Such reference numbers are provided for illustration, and are not intended to limit the invention.

In order to address the above-mentioned problem, a motorcycle is provided including: a vehicle body frame (13) that supports a fuel tank (40) behind a head pipe (15) and that supports an engine (50) below the fuel tank (40); and an air cleaner (71) that is arranged behind the fuel tank (40). In the intake structure for the motorcycle, the fuel tank (40) includes a left tank member (41) that is arranged on a left side of a vehicle body and a right tank member (42) that is arranged on a right side of the vehicle body, the left and right tank members (41, 42) being configured such that at least one of the left and right tank members (41, 42) is formed with a recessed portion (201) that is opened upward and inward, that extends rearward, that subsequently extends downward, and that is formed of a tank wall having a L-shaped cross section, and lid members (12, 34) are provided to cover an upper opening of the recessed portion (201), the recessed portion (201) being configured to function as an intake passage (210) connected to the air cleaner (71).

In the above-mentioned construction, the lid members (12, 34) may have a seat (12) that is arranged above the fuel tank (40) and above the air cleaner (71) and that is provided to seat an rider thereon.

Also, in the above-mentioned construction, the lid members (12, 34) may have the seat (12) and a cover member (34) that extends forward from the seat (12).

Also, in the above-mentioned construction, the recessed portion (201) may have a vertical depth greater than a horizontal width along a vehicle width direction.

Also, in the above-mentioned construction, a downstream end of the recessed portion (201) may be configured to be opened toward an element (105) of the air cleaner (71) and to be formed to have a height communicating with upper and lower sides of the element (105).

Also, in the above-mentioned construction, each of the left and right tank members (41, 42) may be formed with the recessed portion (201), and the intake passage (210) linearly extending in a longitudinal direction in the center in the vehicle width direction in a planar view of the vehicle body may be formed by the recessed portion (201).

Advantageous Effects of Invention

In the present invention, a fuel tank supported behind a head pipe includes a left tank member that is arranged on a left side of a vehicle body and a right tank member that is arranged on a right side of the vehicle body, the left and right tank members are configured such that at least one of the left and right tank members is formed with a recessed portion that is opened upward and inward, that extends rearward, that subsequently extends downward, and that is formed of a tank wall having a L-shaped cross section, lid members are provided to cover an upper opening of the recessed portion, and the recessed portion is configured to function as an intake passage connected to the air cleaner. With this construction, it becomes possible to provide the intake passage in the fuel tank arranged in an upper portion of the vehicle body and to easily mold the fuel tank.

Also, when the lid members are configured to have a seat that is arranged above the fuel tank and above the air cleaner and that is provided to seat an rider thereon, the lid members for covering portions not covered with the seat can be miniaturized, and miniaturization of exclusive components for the intake passage and a reduction in weight of the whole vehicle body can be achieved.

Also, when the lid member is configured to have the seat and a cover member extending forward from the seat, easy access to the inside of the recessed portion and the air cleaner can be performed by removing the seat, and maintainability can be improved.

Also, when the recessed portion is configured to have a vertical depth greater than a horizontal width along a vehicle width direction, width of the recessed portion is narrowed while ensuring an opening area of the intake passage, and the fuel tank can be easily thinned in the vehicle width direction. Thinning of an upper tank portion makes it possible to improve comfort for the rider.

Also, when a downstream end of the recessed portion is configured to be opened toward an element of the air cleaner and to be formed to have a height communicating with upper and lower sides of the element, intake efficiency can be improved.

When each of the right and left tank members is formed with the recessed portion and the intake passage linearly extending in a longitudinal direction in the center in the vehicle width direction in a planar view of the vehicle body is formed by the recessed portion, the intake efficiency can be improved while simplifying the shape of each tank and at the same time improving a balance of weight of the right and left tank members.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures and methodology needed for illustrating selected embodiments of the present invention are described herein. Other conventional structures, and those of ancillary and auxiliary components of the system, will be known and understood by those skilled in the art.

Hereinafter, an embodiment of the present invention will be described with reference to drawings. Note that in explanation, description of directions such as front and rear, right and left, and upper and lower is the same as directions with respect to a vehicle body unless otherwise especially stated. Also, note that in each drawing, a reference sign FR is indicative of a front side of the vehicle body, a reference sign UP is indicative of an upper side of the vehicle body, and a reference sign LE is indicative of a left side of the vehicle body.

Figure 1:
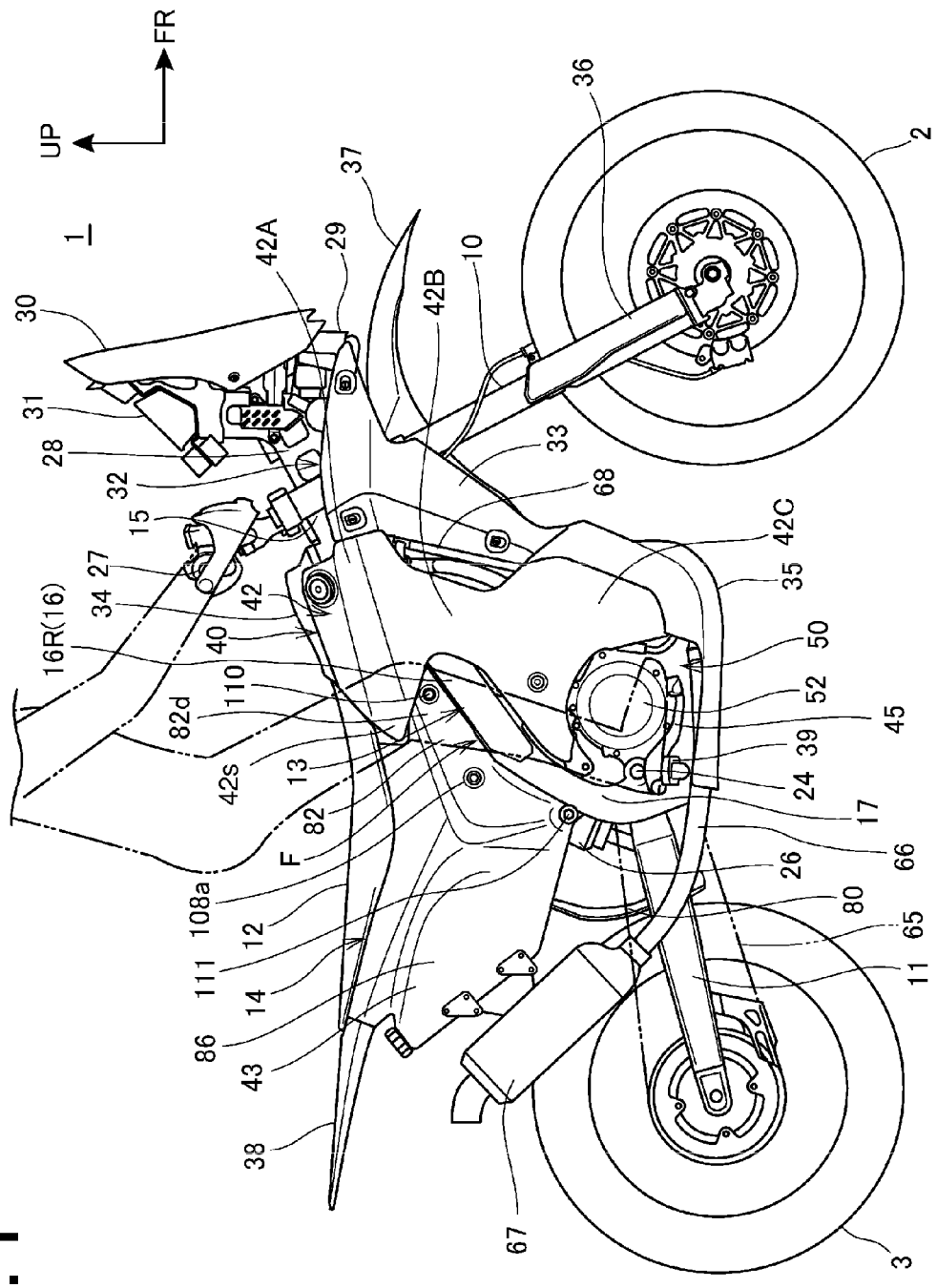
FIG. 1 is a right side view of a motorcycle according to an embodiment of the present invention.
Figure 2:
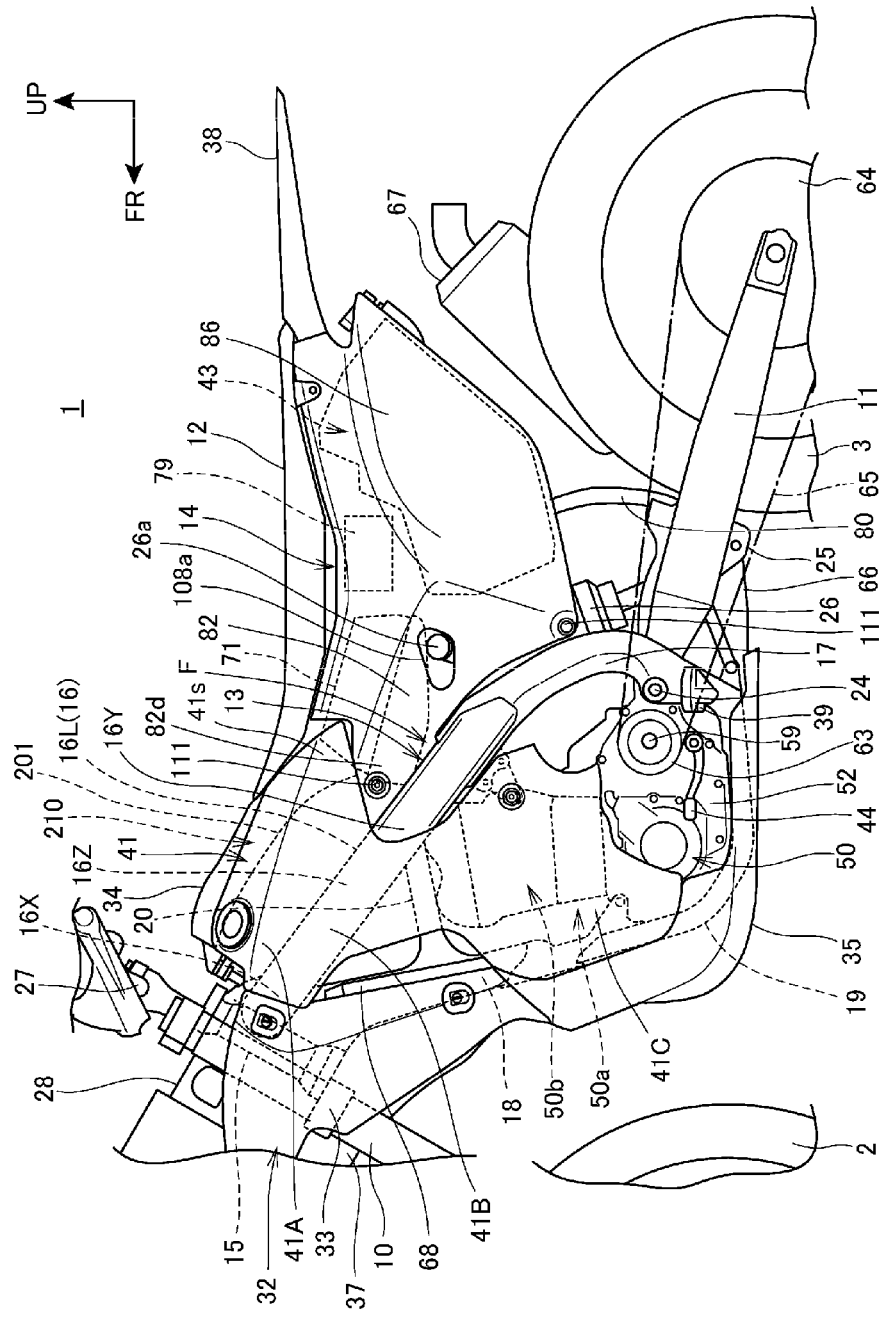
FIG. 2 is a left side view of the motorcycle.

FIG. 1 is a right side view of a motorcycle 1 according to an embodiment of the present invention. FIG. 2 is a left side view of the motorcycle 1.

The motorcycle 1 is a vehicle configured such that an engine 50 as a power unit is supported on a vehicle body frame F, a front fork 10 for supporting a front wheel 2 is steerably supported at a front end of the vehicle body frame F, and a swing arm 11 for supporting a rear wheel 3 is provided to a rear portion of the vehicle body frame F. The motorcycle 1 is a saddle-ride type vehicle configured to include a seat 12 on which an rider is seated thereon in a straddling manner, the seat 12 being provided in an upper portion in the longitudinal center of the vehicle body frame F. The motorcycle 1 is an off-road type vehicle suitable for traveling on an uneven terrain such as sands, has a large suspension stroke, and includes a large-size fuel tank 40.

The vehicle body frame F is composed of a basket-shaped front frame 13 formed by joining metal pipe material and plate material together by welding or the like, and a resin rear frame 14 coupled to a rear portion of the front frame 13.

Figure 3:
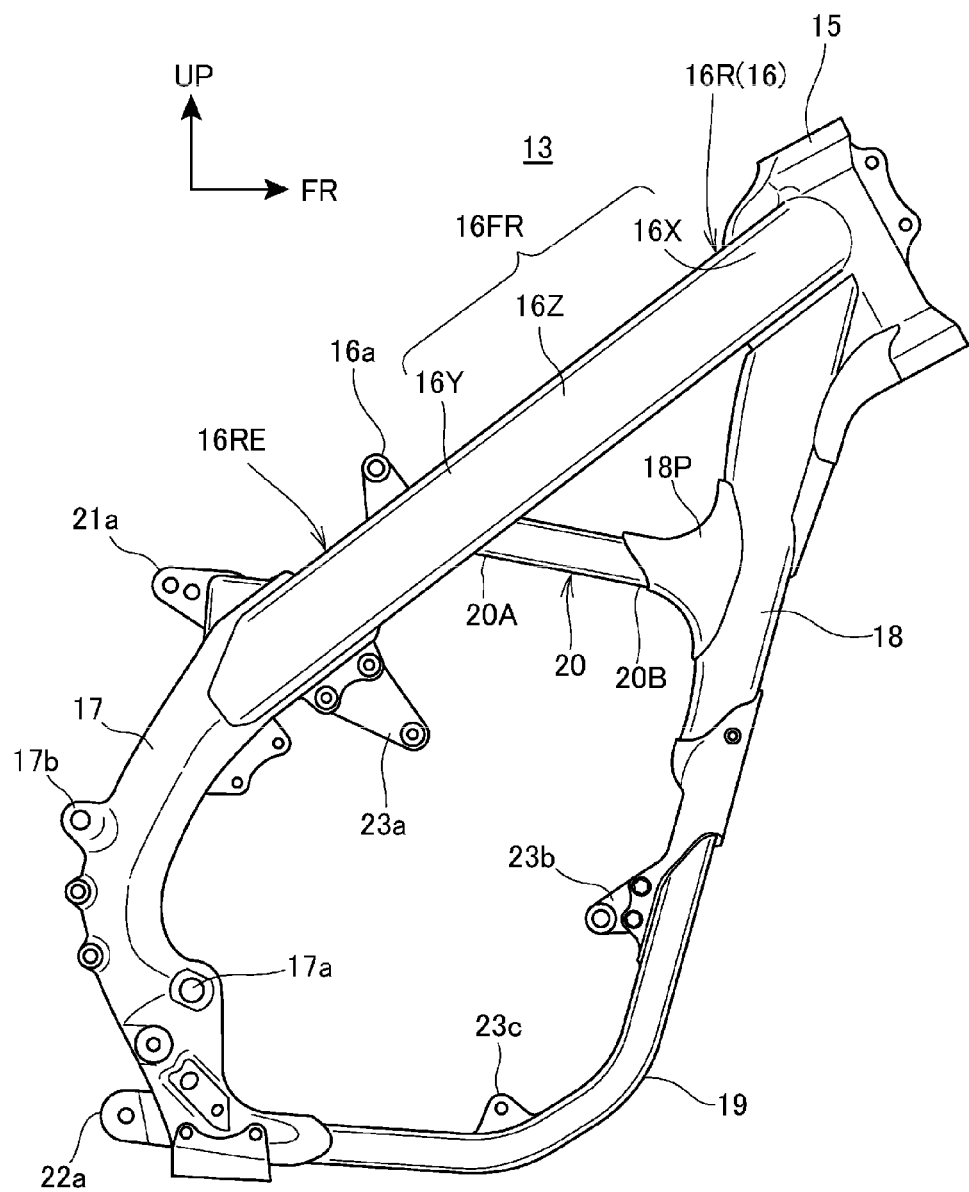
FIG. 3 is a right side view of a front frame.
Figure 4:
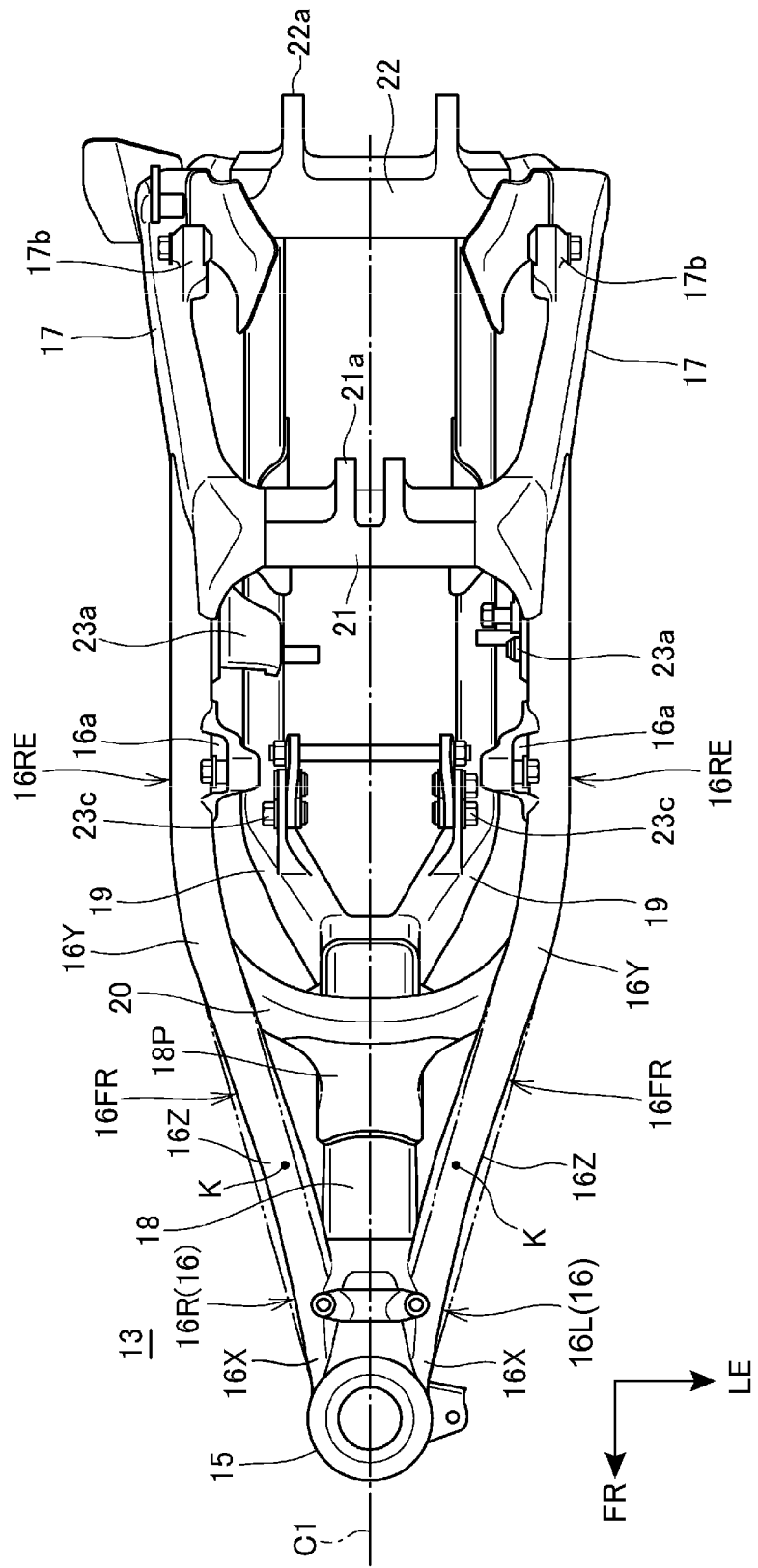
FIG. 4 is a view with the front frame viewed from above.
Figure 5:
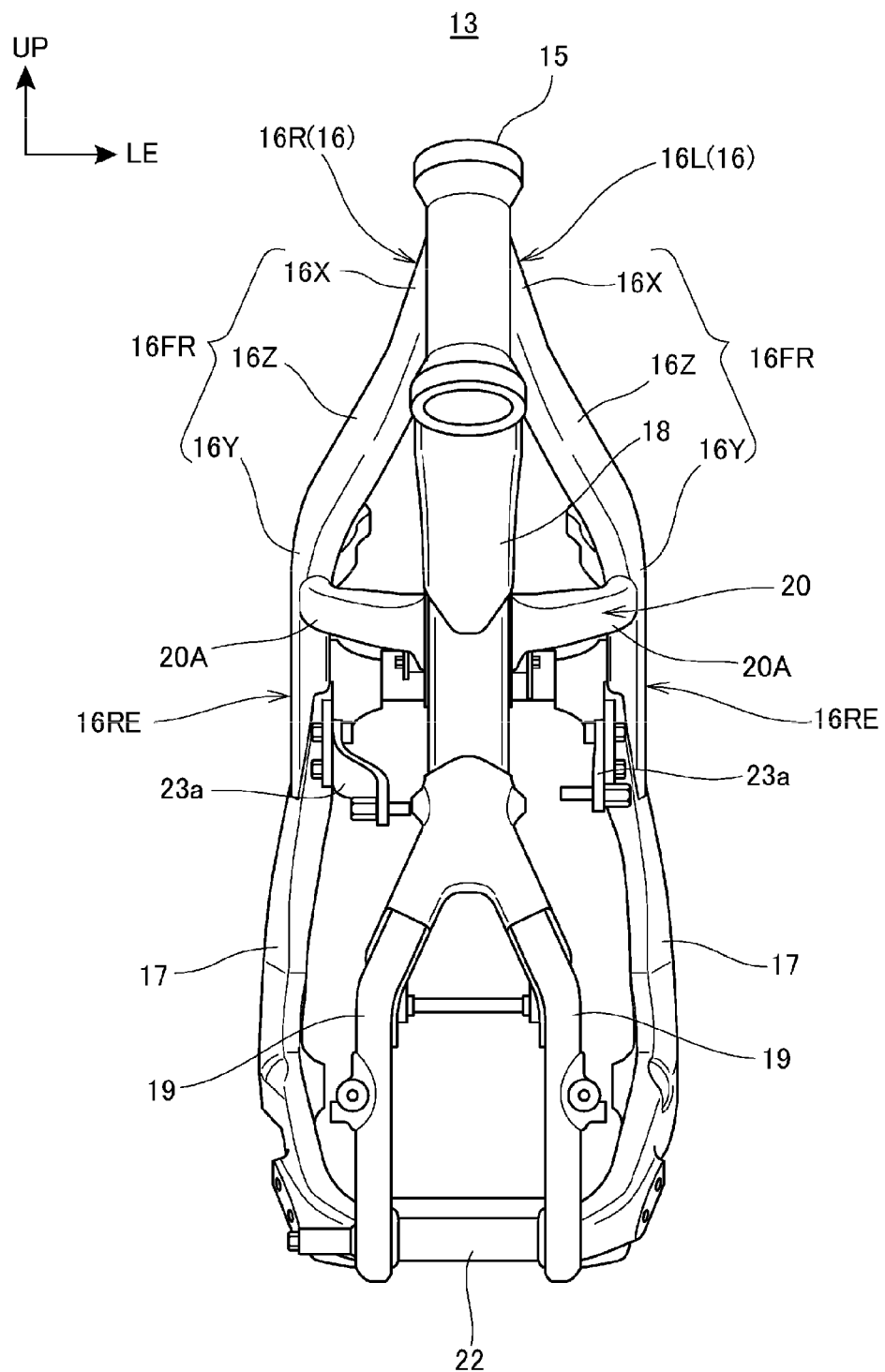
FIG. 5 is a view with the front frame viewed from a front side.

FIG. 3 is a right side view of the front frame 13, FIG. 4 is a view with the front frame 13 viewed from above, and FIG. 5 is a view with the front frame 13 viewed from a front side.

The front frame 13 is provided with a head pipe 15 that is provided at a front end, a pair of right and left main frames 16 (a right main frame 16R and a left main frame 16L) that have front ends coupled to the head pipe 15 and that extend obliquely downward to the rear at intervals in a horizontal direction, and a pair of right and left pivot frames 17, 17 that extend downward from rear ends of the main frames 16L, 16R. Also, the front frame 13 is provided with a down frame 18 that extends rearward and downward from a rear surface of a lower portion of the head pipe 15, and under frames 19, 19 that are branched in the horizontal direction from the down frame 18, that extend downward, that are subsequently curved rearward substantially horizontally, and that are coupled to lower ends of the pivot frames 17, 17.

Also, the front frame 13 is provided with a reinforcing frame 20 that couples an upper portion of the down frame 18 to a longitudinally intermediate portion of each main frame 16. Further, the front frame 13 is provided with an upper cross member 21 that couples the upper portions of the right and left pivot frames 17, 17 to each other in the vehicle width direction, and a lower cross member 22 that couples the lower portions of the pivot frames 17, 17 to each other in the vehicle width direction.

The rear portions of the main frames 16L, 16R, the upper portions of the under frames 19, 19, and the front ends of horizontal portions of the under frames 19, 19 are provided with engine stays 23a, 23b, 23c to which the engine 50 is fixed.

The lower portions of the pivot frames 17, 17 are respectively formed with pivot holes 17a that support a pivot shaft 24 of the swing arm 11. The swing arm 11 has a front end swingably journaled to the pivot shaft 24, and the rear wheel 3 is journaled to a rear end of the swing arm 11.

The upper cross member 21 is provided with a suspension coupling stay 21a that projects rearward. The lower cross member 22 is provided with a link coupling stay 22a that projects rearward, and a link mechanism 25 coupled to the swing arm 11 is coupled to the link coupling stay 22a. A cylindrical rear suspension unit 26 has an upper end that is coupled to the suspension coupling stay 21a and a lower end that is coupled to the link mechanism 25, and is arranged to be inclined forward.

The upper surfaces of the rear portions of the main frames 16L, 16R are respectively provided with upper frame stays 16a that project upward.

The rear surfaces of the vertically intermediate portions of the pivot frames 17, 17 are respectively formed with lower frame stays 17b that project rearward.

The front frame 13 will be described in detail.

The head pipe 15 is a cylindrical member that extends downward to the front side in the center in the vehicle width direction, and rotatably supports an unillustrated steering shaft. The steering shaft is attached with a front fork 10 that supports the front wheel 2. Thereby, the head pipe 15 supports the front wheel 2 steerably in the horizontal direction. Also, a steering handlebar 27 (FIG. 1 and FIG. 2) is fixed to the upper portion of the front fork 10.

The left main frame 16L is arranged on the left side of the vehicle body with respect to a vehicle body central longitudinal plane C1 that extends in the longitudinal direction at the center of a vehicle width, and the right main frame 16R is arranged on the right side of the vehicle body with respect to the vehicle body central longitudinal plane C1. The main frames 16L, 16R are formed into a symmetrical shape based on the vehicle body central longitudinal plane C1.

The respective main frames 16L, 16R are formed of metal frames that extend while having the same cross-sectional surface. More specifically, as shown in FIG. 3 to FIG. 5, the respective main frames 16L, 16R are formed to have a vertically long elliptical cross-sectional surface longer in the vertical direction than the vehicle width direction.

In the planar view when viewed from the upper side of the vehicle body (see FIG. 4), the respective main frames 16L, 16R are integrally provided with main frame front portions 16FR that enlarge outward in the vehicle width direction from the head pipe 15 toward the rear side, and main frame rear portions 16RE that extend rearward in parallel with the vehicle body central longitudinal plane C1 from the rear ends of the main frame front portions 16FR.

Note that, as shown in FIG. 3, in the side view of the vehicle body, the main frame front portions FR and the main frame rear portions RE linearly extend downward to the rear and form a linear main frame that linearly extends downward to the rear from the head pipe 15.

As shown in FIG. 5, rear ends 20A of the reinforcing frame 20 are coupled to the front lower surfaces of the main frame rear portions 16RE. In the planar view of the vehicle body (see FIG. 4), the reinforcing frame 20 is formed into a curved frame that is curved to project forward of the vehicle body. The forefront 20B of the reinforcing frame 20 is jointed to a back surface of the down frame 18 through a metal plate member 18P, and the rear ends 20A on both the right and left ends are respectively jointed to the lower surfaces of the respective main frame rear portions 16RE.

As shown in FIG. 3 to FIG. 5, in the side view of the vehicle body and in the planar view of the vehicle body, a triangular truss frame structure is formed by the reinforcing frame 20, the main frames 16L, 16R, and the down frame 18. Employment of the truss frame structure can efficiently improve frame rigidity.

As shown in FIG. 4, each of the main frame front portions 16FR includes a curved portion 16Z that is curved inward in the vehicle width direction between a front coupling portion 16X coupled to the head pipe 15 and a rear coupling portion 16Y coupled to the reinforcing frame 20.

Each of the curved portions 16Z is formed in such a manner that the whole portion between the front coupling portion 16X and the rear coupling portion 16Y is curved to project inward in the vehicle width direction. Note that, in FIG. 4, the case that the front coupling portion 16X and the rear coupling portion 16Y are coupled to each other through a linear pipe is shown by a two-dot chain line.

Also, in FIG. 4, each reference sign K is indicative of a bending point as a portion of each curved portion 16Z projecting most inward in the vehicle width direction. The bending point K is positioned substantially midway between the front coupling portion 16X and the rear coupling portion 16Y, and the curved portion 16Z is easily bent based on the bending point K.

Since the curved portions 16Z are curved inward in the vehicle width direction, in comparison with the case of connection through the linear pipe, the curved portions 16Z are easily bent inward in the vehicle width direction. For this reason, when receiving force from the outside (for example, force acting on the horizontal direction of the vehicle body), the curved portions 16Z are easily deflected with reference to the bending points K, and the main frames 16L, 16R are easily pliable in the horizontal direction.

In other words, since each curved portion 16Z is a frame located closer to the vehicle body central longitudinal plane C1 than the linear pipe, pliability can be obtained that is similar to a single main frame structure (a monoframe structure) that extends in the longitudinal direction in the center in the vehicle width direction while having a vertical main frame structure (a twin tube frame structure).

Hereby, in the present construction, the stable pliability can be obtained from low external force, the stable pliability being similar to the monoframe structure while having higher frame rigidity than that of the monoframe structure.

Also, since the curved portion 16Z is lengthened in comparison with the linear pipe by the part of a curve portion, the curved portion 16Z can be easily deflected in the vertical direction. Therefore, when receiving force acting on the vertical direction from the outside, the curved portion 16Z is easily deflected in the vertical direction, and the main frames 16L, 16R can be easily deflected also in the vertical direction. Therefore, the stable pliability can be obtained from the low external force.

Note that, as substitute for the curved portion 16Z, when a curved portion that is curved outward in the vehicle width direction is formed, there are the following features. When receiving force acting on the horizontal direction of the vehicle body from the outside, the curved portion that is curved outside in the vehicle width direction is less likely to be deflected in comparison with the linear pipe, and the main frames 16L, 16R are not substantially pliable by the low external force. On the other hand, when the external force exceeds a certain value, the curved portion starts to be bent, and the main frames 16L, 16R are pliable on a relatively large scale. Therefore, sufficient pliability cannot be obtained by the low external force, and also the pliability is unstable.

As shown in FIG. 3 to FIG. 5, in the present construction, other than the main frame front portions 16FR, the curved structure that is curved inward of the vehicle body is not provided. For this reason, deformation except for the main frame front portions 16FR can be suppressed, and the curved shapes (for example, curvature, diameter, length or the like) of the main frame front portions 16FR are adjusted. Thereby, the pliability of the front frame 13 can be easily adjusted.

Also, with the above-mentioned curved structure, since the right and left main frame front portions 16FR are arranged close to the center in the vehicle width direction, thinning in the vehicle width direction can be also achieved. In addition, in the present construction, the respective main frames 16L, 16R have cross-sectional surfaces longer in the vertical direction of the vehicle body than that in the vehicle width direction. Also by such a construction, easy deflection in the vehicle width direction can be achieved, and also the frame behind the head pipe 15 can be thinned.

In the present construction, by using the thinning of the main frames 16L, 16R in the vehicle width direction, as will be described in the following paragraphs, the space outside in the vehicle width direction of the thinned curved portion 16Z is made to function as an arrangement space for front tank members 41, 42 composing a part of the fuel tank 40.

As shown in FIG. 1 and FIG. 2, a front stay 28 that projects forward is fixed to the front portion of the head pipe 15, and a headlight 29, a tabular windshield 30 and meters 31 are supported by the front stay 28.

The fuel tank 40 is provided with a pair of left and right front tank members 41, 42 (left tank member 41 and right tank member 42) that are arranged dividedly on the left and right sides of the respective main frames 16L, 16R. The fuel tank 40 is also further provided with a rear tank member 43 that is arranged in the rear frame 14.

The seat 12 is continuous with the rear portions of the left and right front tank members 41, 42, extends rearward, and is supported on the upper portion of the rear frame 14.

The motorcycle 1 includes a resin vehicle body cover 32. The vehicle body cover 32 is provided with a pair of right and left shrouds 33, 33 that cover upper portions of the front fork 10 and the down frame 18 from a lateral side. The vehicle body cover 32 also includes a tank cover 34 that covers the front tank members 41, 42 from above, an under cover 35 that covers the under frame 19 and the engine 50 from below, and a pair of right and left fork covers 36, 36 that cover a base portion of the front fork 10.

A front fender 37 that covers the front wheel 2 from above is fixed to the front fork 10. A rear fender 38 that covers the rear wheel 3 from above is fixed on the rear frame 14 behind the seat 12.

A pair of right and left steps 39, 39 for placing feet of the rider is provided at lower ends of pivot frames 17, 17. A shift pedal 44 is provided in front of the left step 39, and a brake pedal 45 is provided in front of the right step 39.

The rear frame 14 has right and left front sidewalls 82, 82 and right and left rear sidewalls 86, 86. The upper and lower portions at the front ends of the front sidewalls 82, 82 are respectively provided with upper fastening portions 110 and lower fastening portions 111 that are fastened to the vehicle body frame F. The upper fastening portions 110, 110 are fastened by bolts to upper frame stays 16a, 16a (FIG. 3) of the main frames 16, 16. The lower fastening portions 111, 111 are fastened by bolts to lower frame stays 17b, 17b (FIG. 3) of the pivot frames 17, 17. That is, the rear frame 14 is fastened to the rear portion of the front frame 13 at four positions through the upper fastening portions 110, 110 and the lower fastening portions 111, 111 at the front ends of the right and left front sidewalls 82, 82.

Also, the front sidewalls 82, 82 of the rear frame 14 have tip ends 82d, 82d that extend to a portion between upper swelling portions 41s, 42s and upper edges of the main frames 16, 16, and the upper fastening portions 110, 110 are arranged at the tip ends 82d, 82d. Also, the upper fastening portions 110, 110 are configured in such a manner as to be positioned forward of an output shaft 59 (FIG. 2) of the engine 50 in the longitudinal direction, positioned upward of the head cover 55 and the reinforcing frame 20 in the vertical direction, and arranged in a position away from the lower fastening portions 111, 111 as much as possible, and forward and above the lower fastening portions 111, 111. The lower fastening portions 111, 111 are arranged at lower ends of the front edges of the front sidewalls 82, 82, and are positioned rearward of the output shaft 59 of the engine 50.

Note that, in FIG. 2, a reference sign 108a is indicative of each maintenance opening for exposing the upper portion of the rear suspension unit 26 to the outside, the maintenance opening being formed in each of the vertical intermediate portions of the front sidewalls 82, 82, that is, in each of the upper portions of the sidewalls 108, 108. An operator inserts a tool such as a driver from the maintenance opening 108a, and adjusts an adjustment portion 26a (FIG. 2) provided on the upper portion of the rear suspension unit 26, thereby capable of easily adjusting characteristics such as damping force of the rear suspension unit 26.

Figure 6:
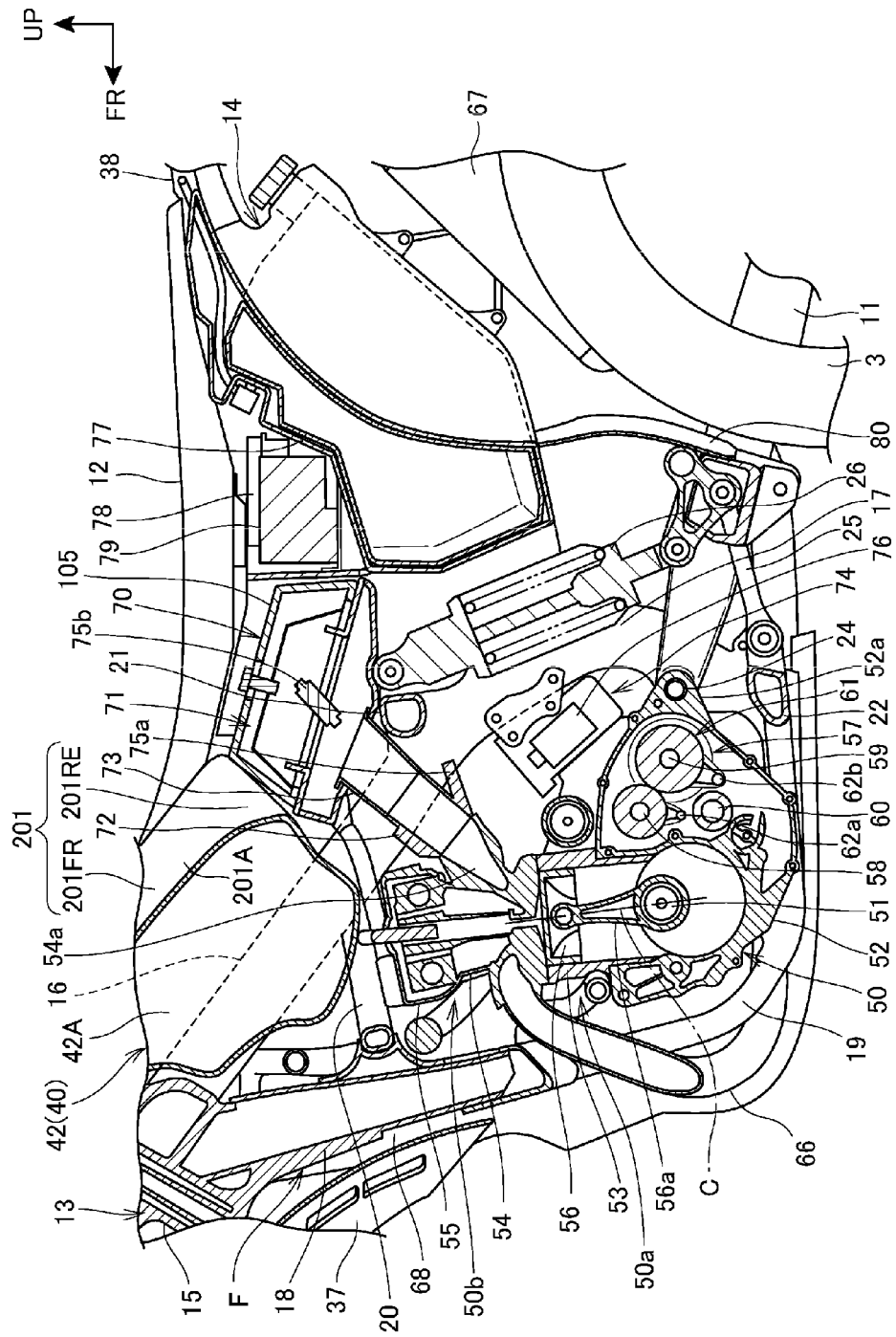
FIG. 6 is a sectional side view with an engine viewed from a left side of a vehicle body together with a peripheral construction.

FIG. 6 is a sectional side view with the engine 50 viewed from the left side of the vehicle body together with a peripheral construction.

As shown in FIG. 1, FIG. 2 and FIG. 6, the engine 50 is a water-cooled single cylinder four-cycle engine, and is supported in the basket-shaped front frame 13. A crankshaft 51 of the engine 50 is arranged to extend horizontally in the vehicle width direction. The engine 50 is provided with a crankcase 52, a cylinder portion 50a that projects upward from an upper surface of a front portion of the crankcase 52, and a cylinder head portion 50b that projects upward from an upper surface of the cylinder portion 50a.

The cylinder portion 50a has a cylinder 53, and a piston 56 coupled to the crankshaft 51 through a connecting rod 56a is provided in the cylinder 53. Since the cylinder head portion 50b stores a valve train, the cylinder head portion 50b is comparatively enlarged in the vehicle width direction and in the longitudinal direction. The upper portion of the cylinder head portion 50b overlaps with the lower edge of the reinforcing frame 20 in the side view. Note that the cylinder head portion 50b includes also the head cover 55.

In addition to the engine stays 23a, 23b and 23c, the engine 50 is supported on the front frame 13 by inserting the pivot shaft 24 into a fixing portion 52a of the rear of the crankcase 52.

The crankshaft 51 is rotatably supported by the front portion of the crankcase 52, and a transmission 57 is stored in the rear of the crankcase 52. The transmission 57 is provided with an input shaft 58 that is driven by the crankshaft 51, the output shaft 59 that is arranged in parallel with the input shaft 58, and a shift drum 60 that is rotated by shift operation of the shift pedal 44. The input shaft 58 and the output shaft 59 are provided with a constant mesh gear train 61. The gear train 61 is switched by shift forks 62a, 62b interlocked with the shift drum 60, thereby performing a gear shift.

The output shaft 59 projects leftward from the rear portion of the crankcase 52, and a drive sprocket 63 (FIG. 2) is fixed to the shaft end of the output shaft 59. Output of the engine 50 is transmitted to the rear wheel 3 through a drive chain 65 laid between the drive sprocket 63 and a driven sprocket 64 for the rear wheel 3. The drive sprocket 63 is covered with a sprocket cover (not shown).

An exhaust pipe 66 of the engine 50 extends downward to the front from the front surface of the cylinder head 54, is subsequently pulled out of the right side, extends rearward along the under frame 19, and is connected to a muffler 67 arranged on the right side of the rear wheel 3. The muffler 67 is supported on the rear frame 14.

A pair of plate-like radiators 68 with cooling water for the engine 50 circulated is provided between the down frame 18 and the right and left shrouds 33, 33.

The front tank members 41, 42 have a size that extends between the shrouds 33, 33 and the rear frame 14, that extends downward from the outer sides of the main frames 16L, 16R, and that covers the lateral sides of the front portions of the cylinder portion 50a and the crankcase 52.

An intake device 70 for the engine 50 is provided below the seat 12 and behind the cylinder head 54. The intake device 70 has an air cleaner 71 that draws in outside air, filters the air and routes it to a throttle body 72 that is connected to an intake port 54a of the cylinder head 54. The intake device 70 includes a connecting tube 73 which connects the throttle body 72 to the air cleaner 71.

The air cleaner 71 is arranged immediately behind the front tank members 41, 42, so as to be substantially continuous with the rear sides of the front tank members, and also is positioned above the rear suspension unit 26. The air cleaner 71 is provided with an air cleaner element 105, and a cross member 97 that doubles as a supporting member for the air cleaner element 105. The air cleaner element 105 is a bowl-shaped element, and is supported by the cross member 97 in order to be swollen upward to the rear. The air cleaner element 105 is a sponge-type air cleaner element; however, a filter paper-type air cleaner element or the like may be used.

The cross member 97 is a cross member that is provided on the rear frame 14, and has a through hole that is vertically passed through and that is formed in the lower portion of the air cleaner element 105. Air cleaned by the air cleaner element 105 is supplied to the connecting tube 73 through the through hole.

In the depicted embodiment, since the air cleaner 71, the connecting tube 73 and the throttle body 72 are linearly arranged in a front downward direction on the side of the engine 50, intake resistance is reduced, and intake efficiency is improved.

A fuel supply system 74 for the engine 50 is provided below the intake device 70. The fuel supply system 74 is provided with injectors 75a, 75b that inject fuel to the intake passage in the throttle body 72, and a fuel pump 76 that supplies the fuel to the injectors 75a, 75b. Fuels in the front tank members 41, 42 and the rear tank member 43 are integrally sucked by the fuel pump 76, and are delivered from the fuel pump 76 to the injectors 75a, 75b.

The fuel pump 76 is formed into a cylindrical shape, and is arranged to be forwardly inclined above the rear portion of the crankcase 52 and in front of the rear suspension unit 26.

The rear frame 14 is provided with an electric component storage portion 77 arranged behind the air cleaner 71. An ECU 78 as a control part for the motorcycle 1 and a battery 79 are stored in the electric component storage portion 77.

The lower portion of the rear frame 14 is attached with a mud guard 80 that extends downward to the front side of the rear wheel 3.

As shown in FIG. 3, an inner space having a triangular shape in the side view of the vehicle body is formed by the main frames 16L, 16R, the pivot frames 17, 17, the down frame 18, and the under frames 19, 19, and the engine 50 (FIG. 6) is arranged to be stored in the space. Here, since the triangular inner space is narrowed according as it is directed to an upper front side, it becomes difficult to ensure an arrangement space for the cylinder head portion 50b composing the upper portion of the engine 50.

In the present construction, as shown in FIG. 4, an outermost portion on an outermost side in the vehicle width direction is composed of rear coupling portions 16Y of the main frame front portions 16FR, and the main frame rear portions 16RE. Then, as shown in FIG. 6, the rear portion of the cylinder head portion 50b is arranged to be positioned inside of the rear coupling portions 16Y composing a part of the outermost portions of the main frames 16L, 16R and to overlap with the rear coupling portions 16Y in the side view of the vehicle body.

With this construction, the cylinder head portion 50b can be arranged effectively using a space widest in the main frames 16L, 16R, and the engine 50 can be efficiently arranged in the space in the front frame 13.

Figure 7:
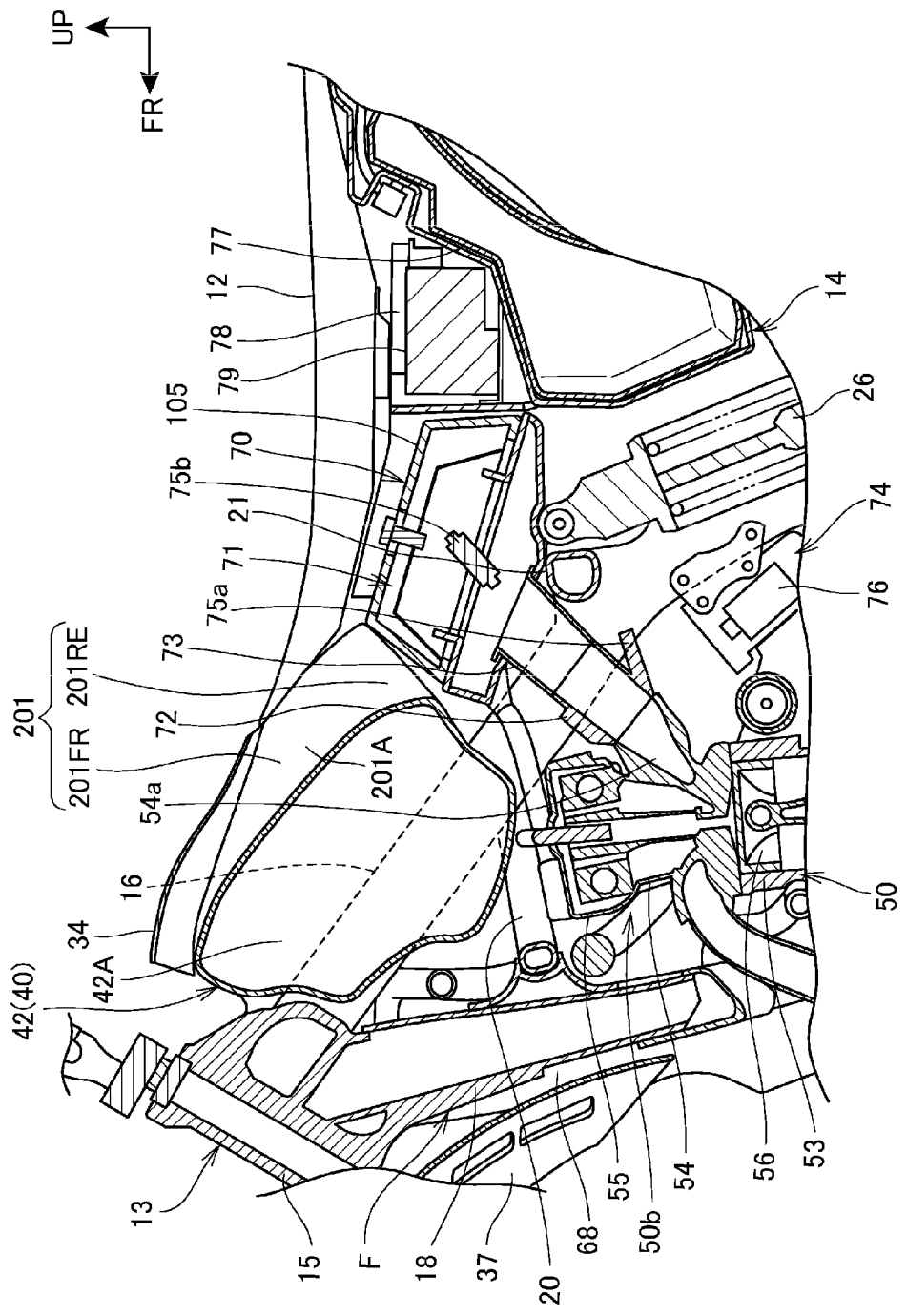
FIG. 7 is a sectional side view with front tanks viewed from a left side of the vehicle body together with the peripheral construction.
Figure 8:
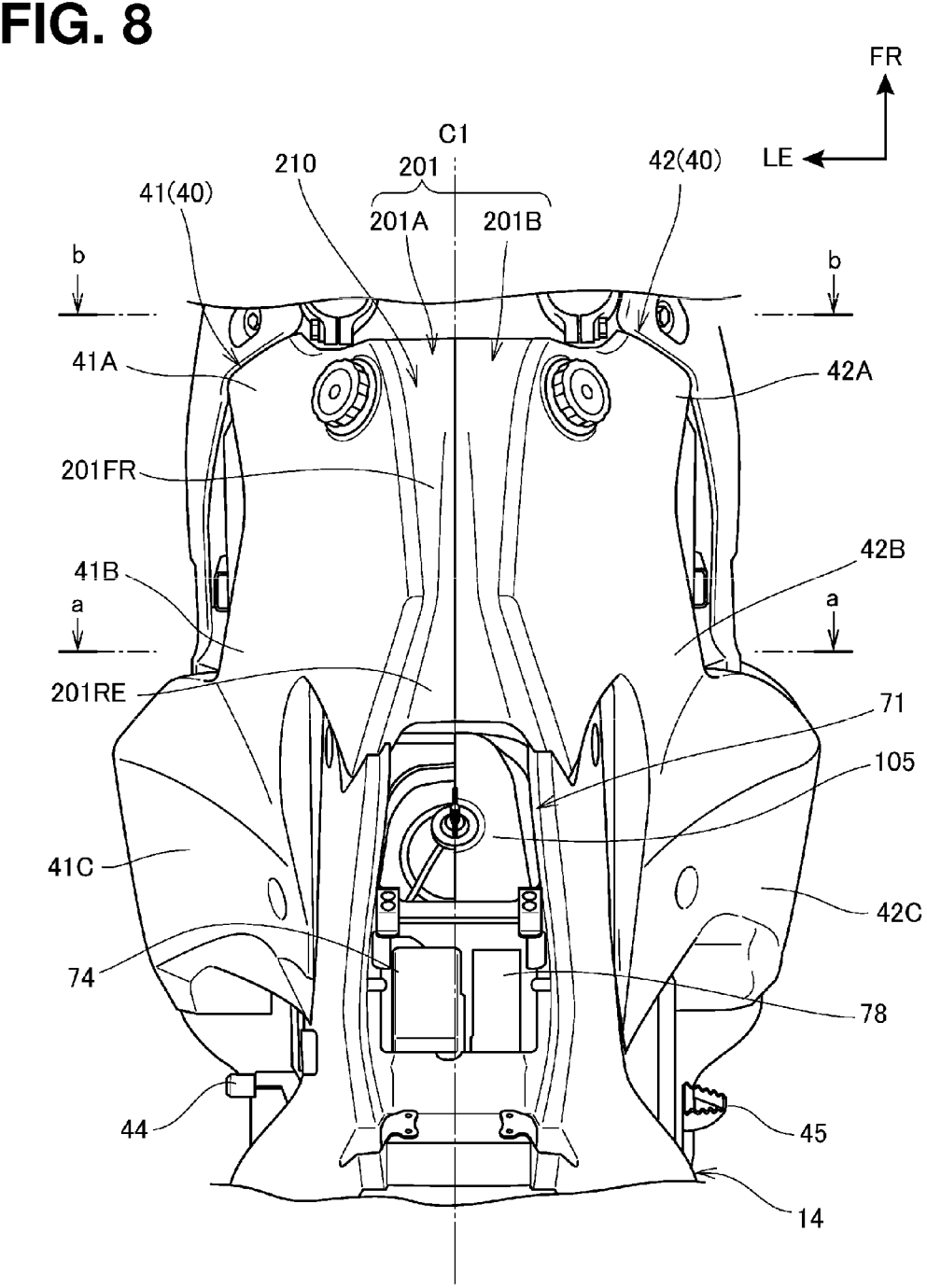
FIG. 8 is a view with the front tanks viewed from above the vehicle body together with the peripheral construction.

FIG. 7 is a sectional side view with the front tank members 41, 42 viewed from the left side of the vehicle body together with the peripheral construction, and FIG. 8 is a view with the front tank members 41, 42 viewed from above the vehicle body together with the peripheral construction.

As shown in FIG. 7 and FIG. 8, the front tank members 41, 42 (the left tank member 41 and the right tank member 42) are supported on the main frames 16L, 16R behind the head pipe 15 (FIG. 1 and FIG. 2).

Each of the left tank member 41, arranged on the left side of the vehicle body, and the right tank member 42 arranged on the right side of the vehicle body, is formed as a large-size tank that extends downward through the outside in the vehicle width direction from the upper side of each of the main frames 16L, 16R and that is vertically long. Note that the fuels in the tank members 41, 42 are supplied through a fuel hose to the fuel supply system 74 (FIG. 7) arranged in the empty space between the crankcase 52 and the rear suspension unit 26, and are supplied to the engine 50 through the fuel supply system 74.

Hereinafter, in the front tank members 41, 42, portions above the main frames 16L, 16R represent upper tank portions 41A, 42A, portions striding over the outside in the vehicle width direction of the main frames 16L, 16R represent intermediate tank portions 41B, 42B, and portions below the main frames 16L, 16R represent lower tank portions 41C, 42C.

Also, the front tank members 41, 42 have a symmetrical shape in relation to one another, based on the vehicle body central longitudinal plane C1. Therefore, hereinafter, the left tank member 41 will be described in detail herein, and a redundant explanation of the right tank member 42 is omitted.

As shown in FIG. 8, the upper tank portion 41A of the left tank member 41 is formed as the fuel tank that extends in the longitudinal direction above the main frame 16L, that is wider than the main frame 16L, and that extends to the vehicle body central longitudinal plane C1. Thereby, capacity of the upper tank portion 41A can be made to have a large capacity by using the upper space of the main frame 16L (including the upper space between the main frame 16L and the vehicle body central longitudinal plane C1).

As shown in FIG. 8, in the longitudinal direction of the vehicle body, the upper tank portion 41A extends from an area in the vicinity of the back surface of the head pipe 15 to the vicinity of the air cleaner 71. Also, the upper portion of the air cleaner 71 is covered with the seat 12 (FIG. 7).

As shown in FIG. 2 and FIG. 8, the intermediate tank portion 41B is the fuel tank that is arranged outside in the vehicle width direction of the main frame 16L and that uses a space outside of the main frame 16L as a fuel space. More specifically, the intermediate tank portion 41B is formed to have a tank shape that has a fanwise outer shape continuous with the outer shape of the upper tank portion 41A and extending downward, and that is shortest in the longitudinal direction among the upper tank portion 41A to the lower tank portion 41C. Also, the surface inside the vehicle width direction of the intermediate tank portion 41B is closest to the main frame 16L, and the space outside of the main frame 16L is efficiently utilized as the fuel space.

The lower tank portion 41C is a tank that is longer in the longitudinal direction than the intermediate tank portion 41B, that overhangs outward in the vehicle width direction, and that overhangs most outward in the vehicle width direction among the upper tank portion 41A to the lower tank portion 41C. More specifically, the lower tank portion 41C is formed to have a tank shape that has a fanwise outer shape continuous with the outer shape of the intermediate tank portion 41B and extending downward, and that extends in the longitudinal direction in comparison with the intermediate tank portion 41B. The lower tank portion 41C is formed into a shape that is arranged over the upper portion from the lateral side of the cylinder portion 50a of the engine 50 and from the front side of the crankcase 52, and that does not overlap with the crankcase 52 as the widest portion of the engine 50 in the side view.

A large tank capacity can be achieved by the lower tank portion 41C, and lowering of the center of gravity of the vehicle body can be also advantageously achieved by distributing some of the fuel weight to the lower tank portion. Also, since the lower tank portion 41C does not exist around the step 39, which is provided for receiving a foot of the rider, the lower tank portion 41C does not become an obstacle to movement of the foot, and the comfort and convenience for the rider can be improved.

Also, as shown in FIG. 2, each of the lower portion of the back surface of the upper tank portion 41A, the whole back surface of the intermediate tank portion 41B, and the lower portion of the back surface of the lower tank portion 41C is formed into a narrow shape projecting forward. The narrow shape projecting forward corresponds to an area configured to accommodate knees and legs of the rider seated on the motorcycle. In this way, the tank portions 41A to 41C do not become an obstacle to movement of the knees or the like. Also with this arrangement, comfort and ease of use for the rider can be improved.

Also, the upper tank portion 41A of the left tank member 41 and the upper tank portion 42A of the right tank member 42 are formed with a symmetrical shape in relation to the vehicle body central longitudinal plane C1. Thereby, as shown in FIG. 8, the upper tank portion 41A of the left tank member 41 and the upper tank portion 42A of the right tank member 42 are arranged close to each other, and form an external appearance simulating an integral tank that extends from the vicinity of the back surface of the head pipe 15 to the vicinity of the air cleaner element 105.

In the present construction, a recessed portion 201 opened upward and inward is formed in a boundary division between the upper tank portions 41A and 42A, and the recessed portion 201 is continuous with the rear ends of the upper tank portions 41A, 42A from the front ends thereof.

Next, the recessed portion 201 and a peripheral construction thereof will be described in detail.

As shown in FIG. 8, the upper tank portions 41A, 42A are respectively formed with tank recessed portions 201A, 201B opened upward and inward. The tank recessed portions 201A, 201B are symmetrically formed in relation to the vehicle body central longitudinal plane C1, and the recessed portion 201 is formed by the tank recessed portions 201A and 201B.

The recessed portion 201 integrally has a first recessed portion 201FR that linearly extends rearward along the upper surfaces of the upper tank portions 41A, 42A from a front end to a rear upper end, and a second recessed portion 201RE that linearly extends downward from the first recessed portion 201FR to the rear lower end. Thereby, each of walls inward in the vehicle width direction of the upper tank portions 41A, 42A forming the recessed portion 201 is formed to have an L-shaped cross section. Note that the L-shape may include a non-right shape or may have an uneven shape formed in the walls inward in the vehicle width direction.

As shown in FIG. 8, the first recessed portion 201FR is formed into a recessed shape that is narrowed in the vehicle width direction toward the rear side, and the second recessed portion 201RE is formed into a recessed shape that is enlarged in the vehicle width direction toward the lower side.

Figure 9:
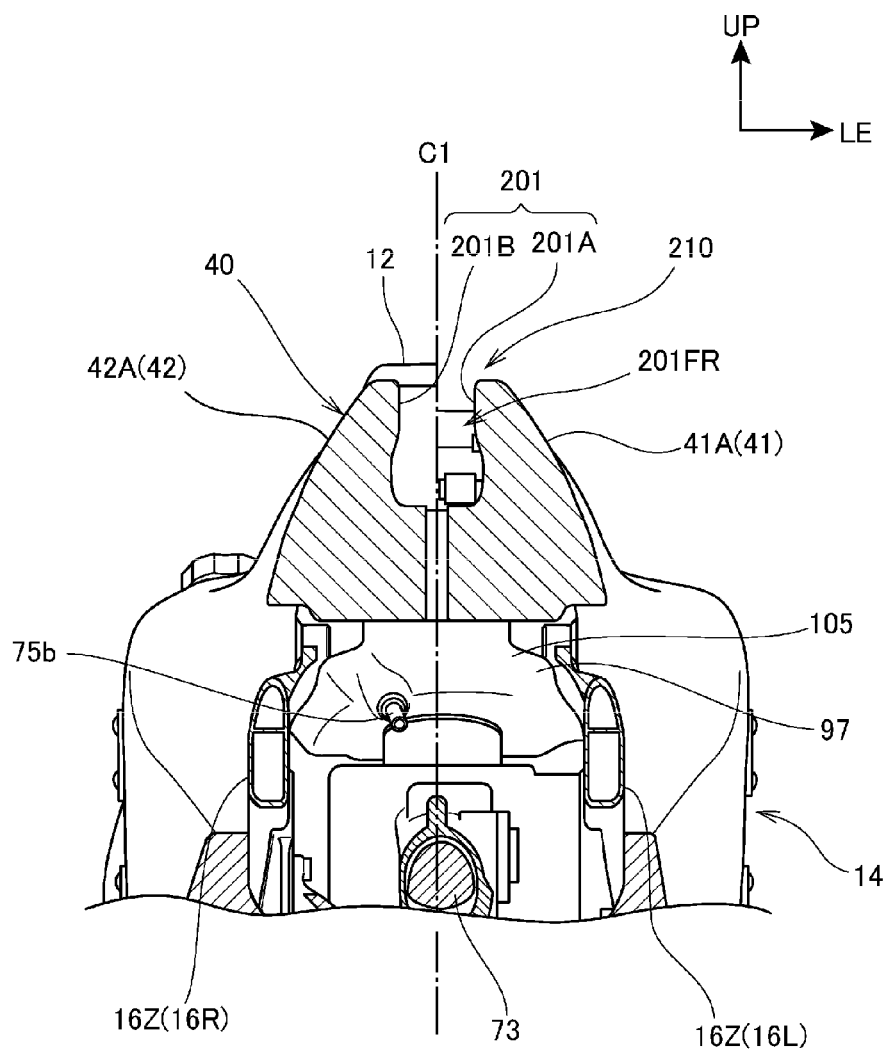
FIG. 9 is a cross-sectional view taken along a-a in FIG. 8.

FIG. 9 is a cross-sectional view taken along a-a in FIG. 8. Note that, in FIG. 9, the left side of paper with respect to the vehicle body central longitudinal plane C1 shows a state where the seat 12 is attached, and the right side of the paper with respect to the vehicle body central longitudinal plane C1 shows a state where the seat 12 is detached.

As shown in FIG. 9, the recessed portion 201 is formed to have vertical depth greater than the horizontal width taken along the vehicle width direction. Thereby, the vehicle width at the position to which the feet of the rider abut can be narrowed, and the comfort for the rider can be improved.

As shown in FIG. 8, the second recessed portion 201RE is formed into a recessed shape that is enlarged in the vehicle width direction toward the lower side. For this reason, the width of the recessed portion 201 can be enlarged toward the air cleaner element 105, and when traveling wind as will be described later after passing through the recessed portion 201 is guided to the air cleaner element 105, the traveling wind can be efficiently guided to the air cleaner element 105.

Here, as shown in FIG. 8, the upper opening of the second recessed portion 201RE is covered with the seat 12, and the upper opening of the first recessed portion 201FR is covered with the tank cover 34 that extends forward from the seat 12.

Figure 10:
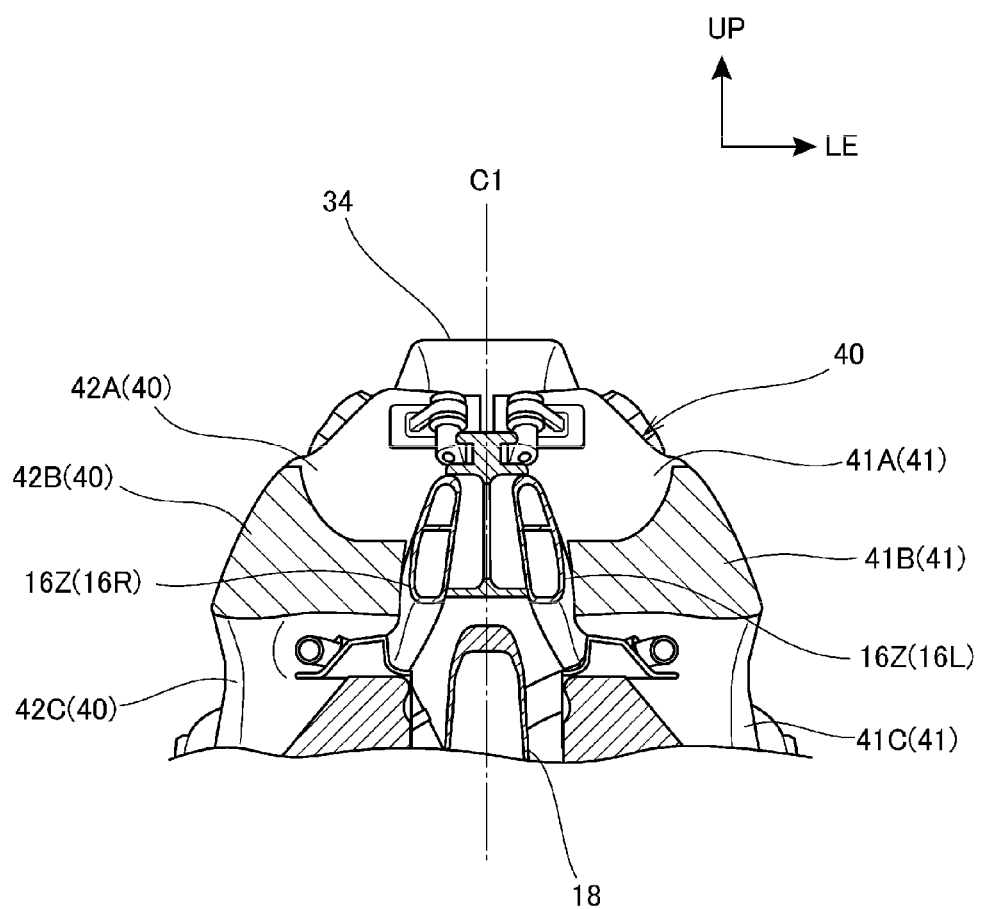
FIG. 10 is a cross-sectional view taken along b-b in FIG. 8.

FIG. 10 is a cross-sectional view taken along b-b in FIG. 8. The tank cover 34 functions as a cover member for covering the upper opening of the first recessed portion 201FR, and prevents dust, rainwater or the like from the upper side from entering into the first recessed portion 201FR. Note that, as shown in FIG. 10, an empty narrow space located in a forward direction is opened between the upper tank portions 41A, 42A located on the left and right sides, and the traveling wind from the front side of the vehicle body can enter into the first recessed portion 201FR through the clearance.

Also, since the second recessed portion 201RE is covered with the seat 12, the dust, rainwater or the like from the upper side can be prevented from entering into the second recessed portion 201RE.

As has been described above, since each of the upper tank portions 41A, 42A is formed as the tank that extends to the vicinity of the air cleaner 71, as shown in FIG. 8, the second recessed portion 201RE is opened toward the air cleaner 71. For this reason, the traveling wind entering into the first recessed portion 201FR is guided toward the air cleaner 71 through the second recessed portion 201RE.

That is, an intake passage (hereinafter, called an outside air supply passage) 210 for supplying the outside air to the air cleaner 71 is composed of the recessed portion 201 formed of the first recessed portion 201FR and the second recessed portion 201RE, and the lid members (the seat 12 and the tank cover 34) for covering the recessed portion 201.

In this way, the outside air supply passage 210 can be formed in the upper tank portions 41A, 42A (the front tank members 41, 42) that are arranged on the upper portion of the vehicle body. In this case, the lower space of each of the upper tank portions 41A, 42A can be used as a layout space for comparatively heavy components, and it is not necessary to keep the space for the outside air supply passage 210 in the lower portion of each of the upper tank portions 41A, 42A. For this reason, such arrangement is advantageous to lowering of the center of gravity of the vehicle body.

Also, the upper tank portions 41A, 42A that are separately provided on the left side and the right side are formed with the tank recessed portions 201A, 201B, thereby forming the recessed portion 201 as the outside air supply passage 210. Therefore, in comparison with the case that the upper tank portions 41A, 42A are integrally formed, the recessed portion 201 can be easily formed.

Also, inner walls of the upper tank portions 41A, 42A (front tank members 41, 42) compose a sidewall and a bottom wall for partitioning the outside air supply passage 210 from the outside, and the seat 12 and the tank cover 34 compose an upper wall for partitioning the outside air supply passage 210 from the outside. Therefore, as an exclusive component for partitioning the outside air supply passage 210, only the tank cover 34 is required. For this reason, the number of components can be reduced, and the above-mentioned arrangement is also advantageous to a reduction in weight.

Also, as the tank cover 34, a compact component for covering only a portion not covered with the seat 12 can be used, and in addition, the tank cover 34 is fixed to the seat 12. Therefore, the tank cover 34 can be easily detached from the vehicle body. With this arrangement, the exclusive component for the intake passage can be miniaturized to achieve a reduction in weight of the whole vehicle body, and the maintenance of the air cleaner 71 or the like can be easily performed by removing the seat 12.

Also, the second recessed portion 201RE composing the downstream side of the recessed portion 201 is opened toward the air cleaner element 105, and also has, in the side view of the vehicle body (FIG. 6), the vertical height increased toward the downstream side, and the downstream end formed to have a height communicating with the upper and lower sides of the air cleaner element 105. Thereby, the traveling wind can be supplied throughout the upper and lower portions of the air cleaner element 105, and intake efficiency can be improved.

Also, in the planar view of the vehicle body (FIG. 8), the second recessed portion 201RE has the width enlarged toward the downstream side, and the downstream end formed to have the width communicating with the whole width of the air cleaner element 105. Also by this arrangement, the intake efficiency can be improved.

<As to Vehicle Body Frame Structure>

As has been described above, in the vehicle body frame structure of the embodiment, the left and right main frames 16L, 16R include the curved portions 16Z (see FIG. 4) that are arranged between the front coupling portions 16X coupled to the head pipe 15 and the rear coupling portions 16Y coupled to the reinforcing frame 20 and that are curved inward in the vehicle width direction. With this construction, the main frames 16L, 16R are easily pliable while suppressing the amount of deflection in comparison with the monoframe structure. For this reason, the main frames 16L, 16R are smoothly pliable according to a load to enable external force relaxation by the whole of the main frames 16L, 16R, and frame characteristics suitable for off-road traveling or the like can be achieved.

Also, since the curved portions 16Z are curved inward in the vehicle width direction, suppression of the main frames 16L, 16R in the vehicle width direction can be achieved, and the frame width behind the head pipe 15 can be thinned. In this way, the main frames 16L, 16R are easily pliable, and enlargement of the main frames 16L, 16R can be suppressed. Especially, when the left and right main frames 16L, 16R are deflected, an interval between the left and right main frames 16L, 16R is narrowed, and the left and right main frames 16L, 16R are sinuously deflected. For this reason, behavior of the vehicle body frame F is stabilized.

Also, since the left and right main frames 16L, 16R have a cross-sectional surface longer in the vertical direction of the vehicle body than that in the vehicle width direction, the left and right main frames 16L, 16R can be easily deflected in the vehicle width direction, and also the frame width behind the head pipe 15 can be made to be thinner.

Also, the front tank members 41, 42 are provided, the front tank members 41, 42 being supported on the left and right main frames 16L, 16R and being arranged outside in the vehicle width direction of the curved portions 16Z. Therefore, the front tank members 41, 42 can be arranged while having the large capacity by using the outside space in the narrow part of the frame width. Also, with this construction, the clearance between the main frames 16L, 16R deformed inward of the vehicle body and the front tank members 41, 42 arranged outside of the main frames 16L, 16R can be narrowed. Therefore, the front tank members 41, 42 can be efficiently formed to have the large capacity.

Further, the rear coupling portions 16Y are arranged in the outermost portions on the outermost side in the vehicle width direction of the left and right main frames 16L, 16R (see FIG. 4). In this construction, the engine 50 is arranged in the space surrounded by the main frames 16L, 16R and the down frame 18 so that the outermost portions of the main frames 16L, 16R overlap with the cylinder head portion 50b in the side view. With this construction, the cylinder head portion 50b of the engine 50 can be efficiently arranged using the space widest in the main frames 16L, 16R.

Also, the front tank members 41, 42 (the left tank member 41 and the right tank member 42) are provided with the upper tank portions 41A, 42A and the intermediate tank portions 41B, 42B that are arranged inward and outward in the vehicle width direction of the left and right main frames 16L, 16R above the cylinder head portion 50b. With this construction, enlargement in the vehicle width direction can be suppressed while enlarging the fuel tank 40 above the cylinder head portion 50b.

Also, on the lateral side of the cylinder portion 50a of the engine 50 and above the crankcase 52, the front tank members 41, 42 are provided with the lower tank portions 41C, 42C that are arranged below the main frames 16L, 16R. With this construction, the lowering of the center of gravity can be achieved while arranging the fuel tank 40 in the space above the crankcase 52 and enlarging the fuel tank 40.

<As to Intake Structure>

In the intake structure of the embodiment, the left and right upper tank portions 41A, 42A are provided, the left and right upper tank portions 41A, 42A being arranged in the upper portion of the vehicle body and composing a part of the fuel tank 40. The upper tank portions 41A, 42A are formed with the recessed portion 201 that is opened upward and inward and that is formed of the tank wall having the L-shaped cross section extending rearward and subsequently extending downward. Then, the upper opening of the recessed portion 201 is covered with the lid members (the seat 12 and the tank cover 34). Thereby, the recessed portion 201 is formed as the outside air supply passage 210 connected to the air cleaner 71 (see FIG. 7). With this construction, the outside air supply passage 210 can be easily provided to the upper tank portions 41A, 42A that are arranged in the upper portion of the vehicle body, and also formation of the left and right upper tank portions 41A, 42A can be easily performed.

In this case, since the left and right upper tank portions 41A, 42A are provided, detachment of the respective tank portions 41A, 42A is improved, and the maintainability of the fuel tank 40 is improved. Also, since the outside air supply passage 210 is provided in the upper portion of the vehicle body, the lower space of each of the upper tank portions 41A, 42A can be used as the layout space for the comparatively heavy components, and also such arrangement is advantageous to lowering of the center of gravity of the vehicle body. In addition, it is not necessary to keep the space for the outside air supply passage 210 below the upper tank portions 41A, 42A. Also by this, such arrangement is advantageous to lowering of the center of gravity of the vehicle body. Also, with the construction, the recessed portion 201 is easily deformed, and the degree of freedom in the shape of the outside air supply passage 210 is also improved.

Also, as the lid member for covering the upper opening of the recessed portion 201, the seat 12 on which the rider is seated is used. Therefore, the seat 12 can be efficiently utilized. Also, by the part with the seat 12 utilized, the cover member (the tank cover 34) for covering the part not covered with the seat 12 can be miniaturized, and the miniaturization of the exclusive components for the intake passage and the reduction in weight of the whole vehicle body can be achieved. Also, when the seat 12 is detached, easy access to the inside of the recessed portion 201 and the air cleaner 71 can be performed, and the maintainability is improved.

Also, since the tank cover 34 for covering the part not covered with the seat 12 extends forward from the seat 12 (see FIG. 7), the tank cover 34 can be easily detached together with the seat 12. Also by this, easy access to the inside of the recessed portion 201 and the air cleaner 71 can be achieved, maintainability is improved.

Also, since the recessed portion 201 has the vertical depth greater than the horizontal width along the vehicle width direction (see FIG. 9), the width of the recessed portion 201 can be narrowed while ensuring the opening area of the outside air supply passage 210. Thereby, the left and right upper tank portions 41A, 42A formed with the recessed portion 201 can be easily thinned in the vehicle width direction while ensuring the opening area of the outside air supply passage 210. By thinning the upper tank portions 41A, 42A, the comfort for the rider can be improved.

Also, the downstream end of the recessed portion 201 is opened toward the air cleaner element 105, and also formed to have the height communication with the upper and lower sides of the air cleaner element 105 (see FIG. 7), the intake efficiency can be improved.

Also, the upper tank portions 41A, 42A are respectively formed with the tank recessed portions 201A, 201B, and the outside air supply passage 210 that linearly extends in the longitudinal direction in the planar view of the vehicle body in the center of the vehicle width direction is formed by the tank recessed portions 201A, 201B (see FIG. 8). Thereby, the intake efficiency can be improved while simplifying the shape of each tank and at the same time improving the balance of the weight of the right and left upper tank portions 41A, 42A.

As described above, the present invention has been described based on one embodiment. The present invention is not limited to this, and various design modifications may be made within the scope not departing from the gist of the present invention.

For example, in the above-mentioned embodiment, the case has been described such that the tank recessed portions 201A, 201B that are opened upward and inward are provided to the respective left and right upper tank portions 41A, 42A, and the recessed portion 201 as the outside air supply passage 210 is formed by both the tank recessed portions 201A, 201B. However, it is not limited thereto. For example, the recessed portion 201 as the outside air supply passage 210 may be formed by one of the tank recessed portions 201A, 201B.

That is, in the present invention, the recessed portion 201 may be made to function as the outside air supply passage 210 connected to the air cleaner 71 in such a manner that the recessed portion 201A or 201B that is opened upward and inward, and that has the L-shaped cross section extending rearward and subsequently extending downward is provided to at least one of the left and right upper tank portions 41A, 42A, and the lid members (the seat 12, and the tank cover 34) are provided for covering the upper opening of the recessed portion 201.

Also, as the lid member, only the seat 12 may be used, or only the tank cover 34 may be used. For example, when the seat 12 not covering the upper portion of the fuel tank 40 is used, the tank cover 34 has only to be formed to cover the recessed portion 201. Also, the recessed portion 201 may be covered with only the seat 12 by extending the seat 12 forward.

Also, in the above-mentioned embodiment, the case that the present invention is applied to the off-road type motorcycle 1; however, the present invention is not limited thereto. The present invention can be applied to other motorcycles and saddle-ride type vehicles including vehicles except for the motorcycles. Note that the saddle-ride type vehicles are the vehicles including the whole vehicle with a rider riding on the vehicle body in a striding manner, and vehicles including not only motorcycles (including bicycles with motors) but also including ATVs (All Terrain Vehicles) and three-wheeled vehicles and four-wheeled vehicles classified into autotrucks or the like.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

We claim:

1. A motorcycle comprising:
   a vehicle body frame comprising a head pipe,
   a fuel tank operatively supported on the vehicle body frame behind the head pipe,
   an engine operatively supported on the vehicle body frame below the fuel tank, and
   an air cleaner arranged behind the fuel tank,
      wherein the fuel tank comprises a left tank member arranged on a left side of the vehicle body frame and a right tank member arranged on a right side of the vehicle body frame, the left and right tank members configured such that at least one of the left and right tank members is formed with a recessed portion that is opened upward and inward, that extends rearward, that subsequently extends downward, and that is formed by a tank wall having a L-shaped cross section, and
      further comprising at least one lid member provided to cover an upper opening of the recessed portion, the recessed portion and lid member cooperating to function as an intake passage for routing intake air to the air cleaner.

2. The motorcycle according to claim 1, wherein said at least one lid member comprises a seat for supporting a rider of the motorcycle, said seat arranged above the fuel tank and above the air cleaner.

3. The motorcycle according to claim 2, wherein said at least one lid member further comprises a cover member that extends forward from the seat.

4. The motorcycle according to claim 3, wherein each of the left and right tank members is formed with part of the recessed portion, and the intake passage is formed by the recessed portion extending in a longitudinal direction of the vehicle body frame.

5. The motorcycle according to claim 2, wherein each of the left and right tank members is formed with part of the recessed portion, and the intake passage is formed by the recessed portion extending in a longitudinal direction of the vehicle body frame.

6. The motorcycle according to claim 1, wherein each of the left and right tank members is formed with part of the recessed portion, and the intake passage is formed by the recessed portion extending in a longitudinal direction of the vehicle body frame.

7. The motorcycle according to claim 1, wherein the recessed portion has a vertical depth greater than a horizontal width measured along a vehicle width direction.

8. The motorcycle according to claim 7, wherein each of the left and right tank members is formed with part of the recessed portion, and the intake passage is formed by the recessed portion extending in a longitudinal direction of the vehicle body frame.

9. The motorcycle according to claim 1, wherein a downstream end of the recessed portion is configured to open toward an air cleaner element in the air cleaner, and has a height communicating with upper and lower sides of the air cleaner element.

10. The motorcycle according to claim 9, wherein each of the left and right tank members is formed with part of the recessed portion, and the intake passage is formed by the recessed portion extending in a longitudinal direction of the vehicle body frame.

11. A fuel tank for a motorcycle, said fuel tank comprising:
a left tank member configured for placement on a left side of a vehicle body frame, and a right tank member configured for placement on a right side of the vehicle body frame, the left and right tank members configured such that at least one of the left and right tank members is formed with a recessed portion that is opened upward and inward, that extends rearward, that subsequently extends downward, and that is formed by a tank wall having a L-shaped cross section, and
at least one lid member provided to cover an upper opening of the recessed portion, the recessed portion and lid member cooperating to function as an intake passage for routing intake air to the air cleaner.

12. The fuel tank according to claim 11, wherein said at least one lid member comprises a seat for supporting a rider of the motorcycle, said seat arranged above the fuel tank.

13. The fuel tank according to claim 12, wherein said at least one lid member further comprises a cover member that extends forward from the seat.

14. The fuel tank according to claim 11, wherein the recessed portion has a vertical depth greater than a horizontal width measured along a vehicle width direction.

15. The fuel tank according to claim 11, wherein a downstream end of the recessed portion is configured to open toward an air cleaner element of an air cleaner, and has a height configured to communicate with upper and lower sides of the air cleaner element.

16. The motorcycle according to claim 11, wherein each of the left and right tank members is formed with part of the recessed portion, and the intake passage is formed by the recessed portion extending in a longitudinal direction of the vehicle body frame.

* * * * *